US012654550B2

(12) United States Patent
Seo

(10) Patent No.: US 12,654,550 B2
(45) Date of Patent: Jun. 16, 2026

(54) DISPLAY SYSTEM FOR VEHICLE, VEHICLE, AND DISPLAY METHOD FOR VEHICLE

(71) Applicant: KAWASAKI MOTORS, LTD., Akashi (JP)

(72) Inventor: Jiwon Seo, Akashi (JP)

(73) Assignee: Kawasaki Motors, Ltd., Akashi (JP)

( * ) Notice: Subject to any disclaimer, the term of this patent is extended or adjusted under 35 U.S.C. 154(b) by 200 days.

(21) Appl. No.: 18/462,501

(22) Filed: Sep. 7, 2023

(65) Prior Publication Data

US 2024/0109416 A1 Apr. 4, 2024

(30) Foreign Application Priority Data

Oct. 4, 2022 (JP) ................................. 2022-160433

(51) Int. Cl.
 *B60K 35/00* (2024.01)
 *B60K 35/22* (2024.01)
 *B60K 35/28* (2024.01)
(52) U.S. Cl.
 CPC .............. *B60K 35/00* (2013.01); *B60K 35/22* (2024.01); *B60K 35/28* (2024.01); *B60K 2360/172* (2024.01); *B60K 2360/33* (2024.01); *B60K 2360/347* (2024.01); *B60Y 2200/12* (2013.01)
(58) Field of Classification Search
 CPC .... B60K 35/00; B60K 35/28; B60K 2360/33; B60K 2360/172; B60K 2360/347; B60K 35/22; B60Y 2200/12
 See application file for complete search history.

(56) References Cited

U.S. PATENT DOCUMENTS

| 11,667,195 B2 * | 6/2023 | Luken | ...................... G09G 5/04 |
| | | | 701/99 |
| 2012/0203407 A1 | 8/2012 | Hatanaka et al. | |
| 2012/0306635 A1 * | 12/2012 | Sato | ...................... B60K 35/60 |
| | | | 340/425.5 |
| 2015/0177956 A1 | 6/2015 | Han | |
| 2015/0371408 A1 * | 12/2015 | Schultz | .................... G01P 1/08 |
| | | | 345/589 |
| 2017/0355412 A1 * | 12/2017 | Takeshita | ................ B60L 50/20 |

(Continued)

FOREIGN PATENT DOCUMENTS

| JP | 2002-276407 A | 9/2002 |
| JP | 2009-041987 A | 2/2009 |

(Continued)

OTHER PUBLICATIONS

U.S. Appl. No. 18/462,526, filed Sep. 7, 2023.

*Primary Examiner* — Naeem Taslim Alam
(74) *Attorney, Agent, or Firm* — BURR PATENT LAW, PLLC

(57) ABSTRACT

A display system is a system which can set a first travel mode and a second travel mode. A display system includes: a display displaying an information image indicating vehicle information to be superimposed on a background pattern; and a circuitry controlling a display on the display so that a first background pattern is set as the background pattern when the first travel mode is set and a second background pattern visually recognized to be different from the first background pattern is set as the background pattern when the second travel mode is set.

11 Claims, 8 Drawing Sheets

(56)  References Cited

U.S. PATENT DOCUMENTS

| | | | |
|---|---|---|---|
| 2018/0061325 A1* | 3/2018 | Luo | G09G 3/3258 |
| 2018/0272939 A1* | 9/2018 | Starke | H04N 5/272 |
| 2019/0052265 A1* | 2/2019 | Yokoyama | H03K 17/96 |
| 2019/0204821 A1* | 7/2019 | Yoon | G05D 1/0223 |
| 2020/0047618 A1* | 2/2020 | Suzuki | B60W 50/14 |
| 2020/0406923 A1 | 12/2020 | Ide et al. | |
| 2021/0178897 A1 | 6/2021 | Luken | |
| 2021/0323515 A1* | 10/2021 | Scheuerell | B60T 7/12 |
| 2022/0063404 A1* | 3/2022 | Takabatake | B60K 35/00 |
| 2023/0303125 A1* | 9/2023 | Ide | B60K 35/28 |
| 2025/0006100 A1* | 1/2025 | Zhao | G09G 3/3225 |

FOREIGN PATENT DOCUMENTS

| | | | |
|---|---|---|---|
| JP | 2009-101860 A | 5/2009 |
| JP | 2012-030703 A | 2/2012 |
| JP | 2012-162095 A | 8/2012 |
| JP | 2017-015447 A | 1/2017 |
| JP | 2017-222244 A | 12/2017 |
| JP | 2021-009432 A | 1/2021 |

* cited by examiner

F I G . 1
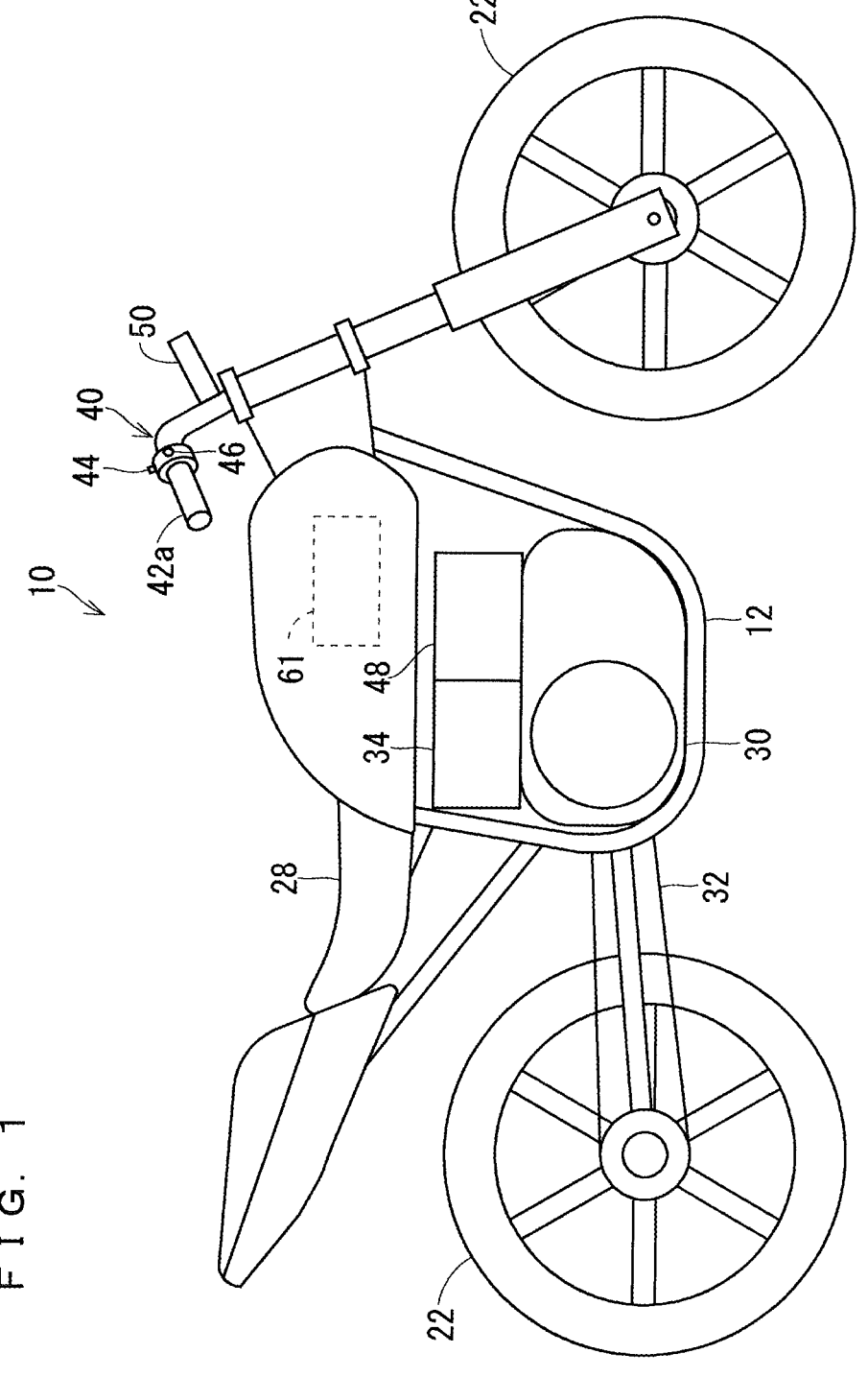

F I G.  2
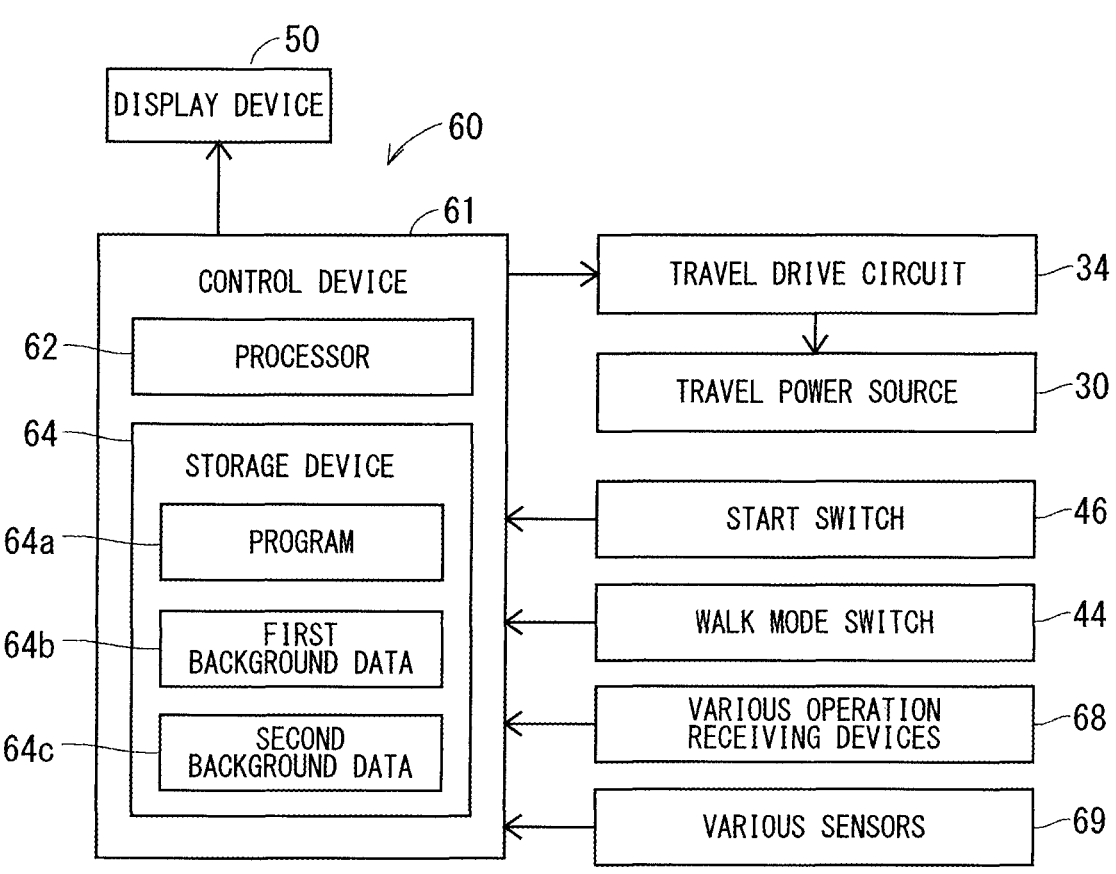

F I G. 3
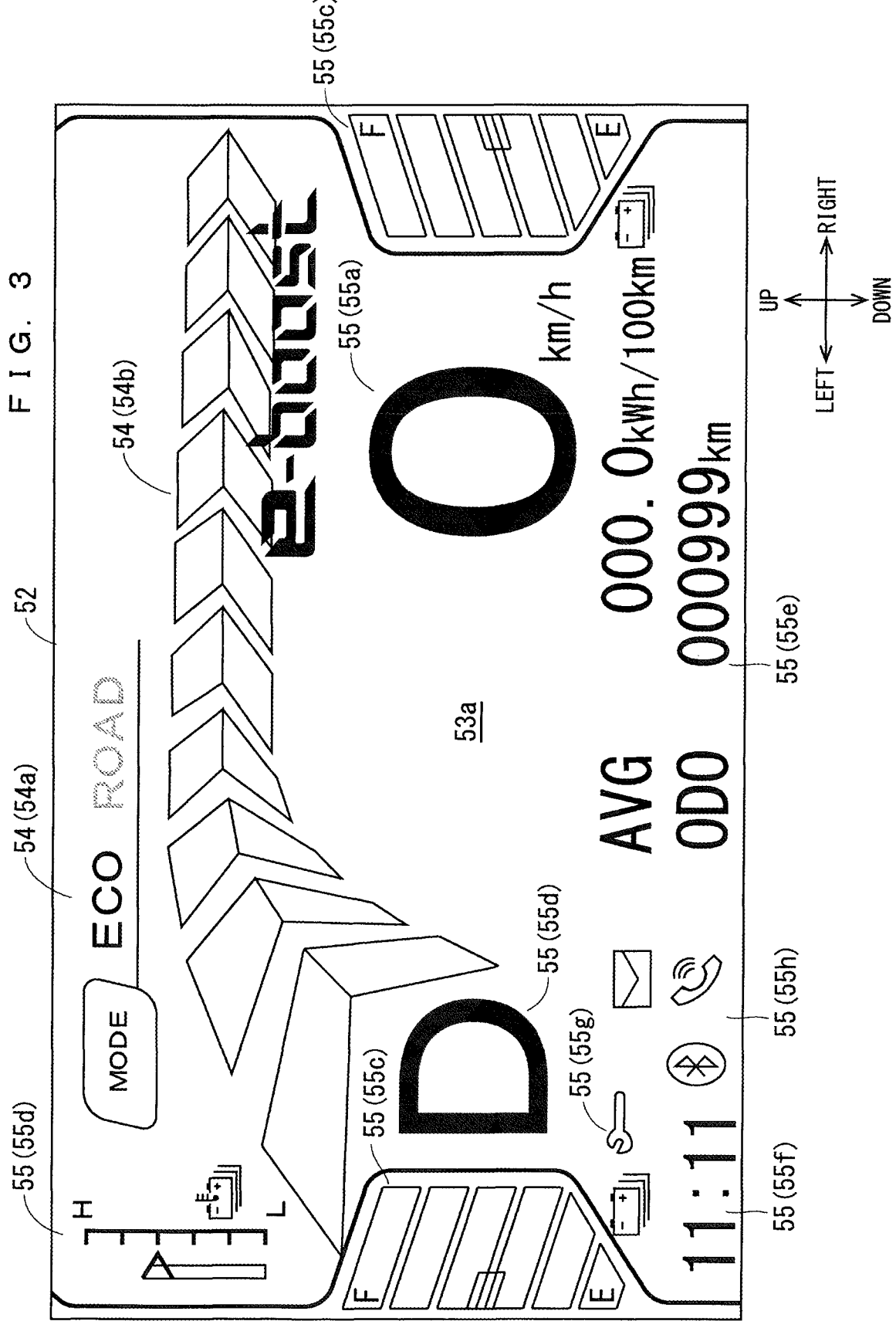

F I G. 4
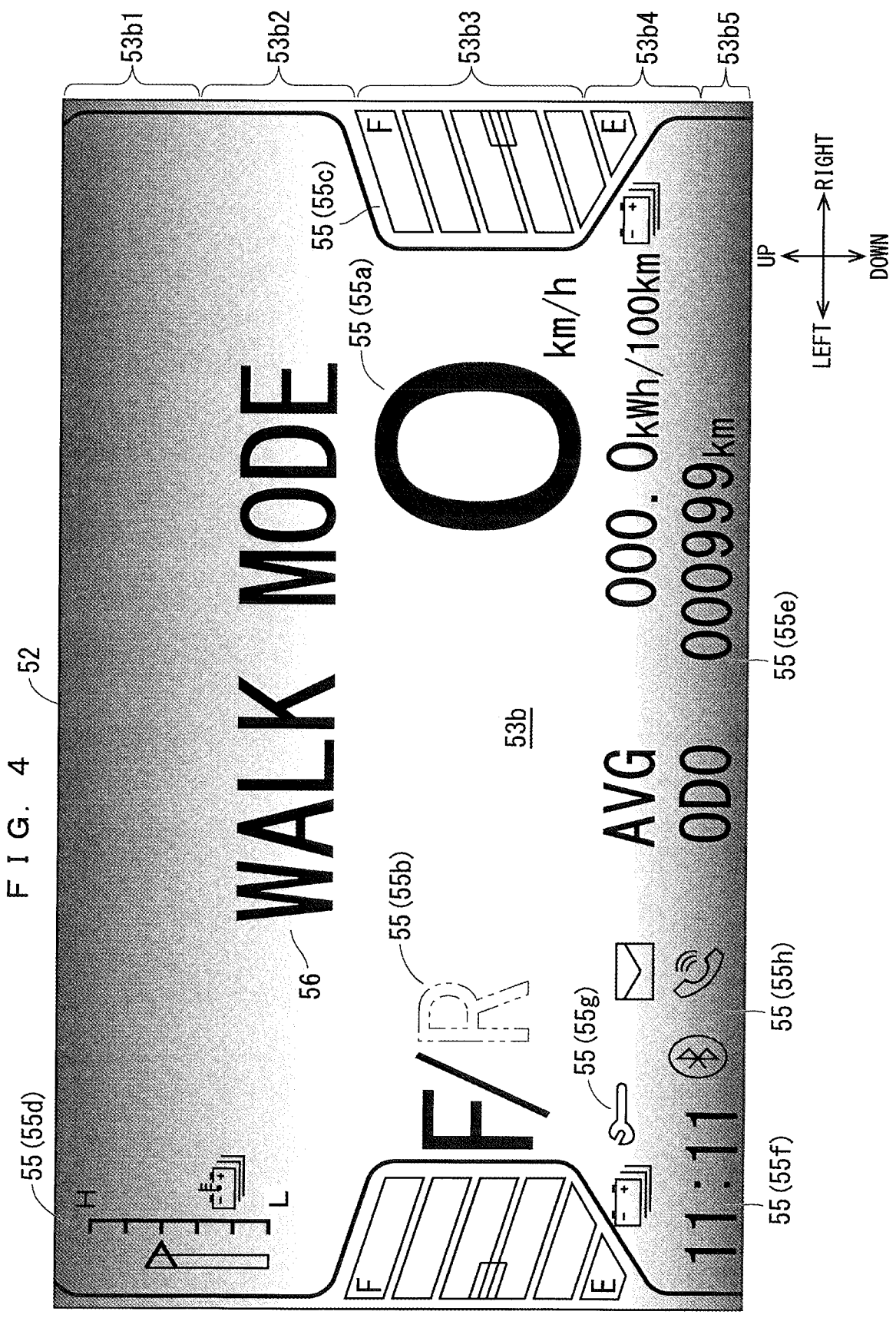

F I G. 5
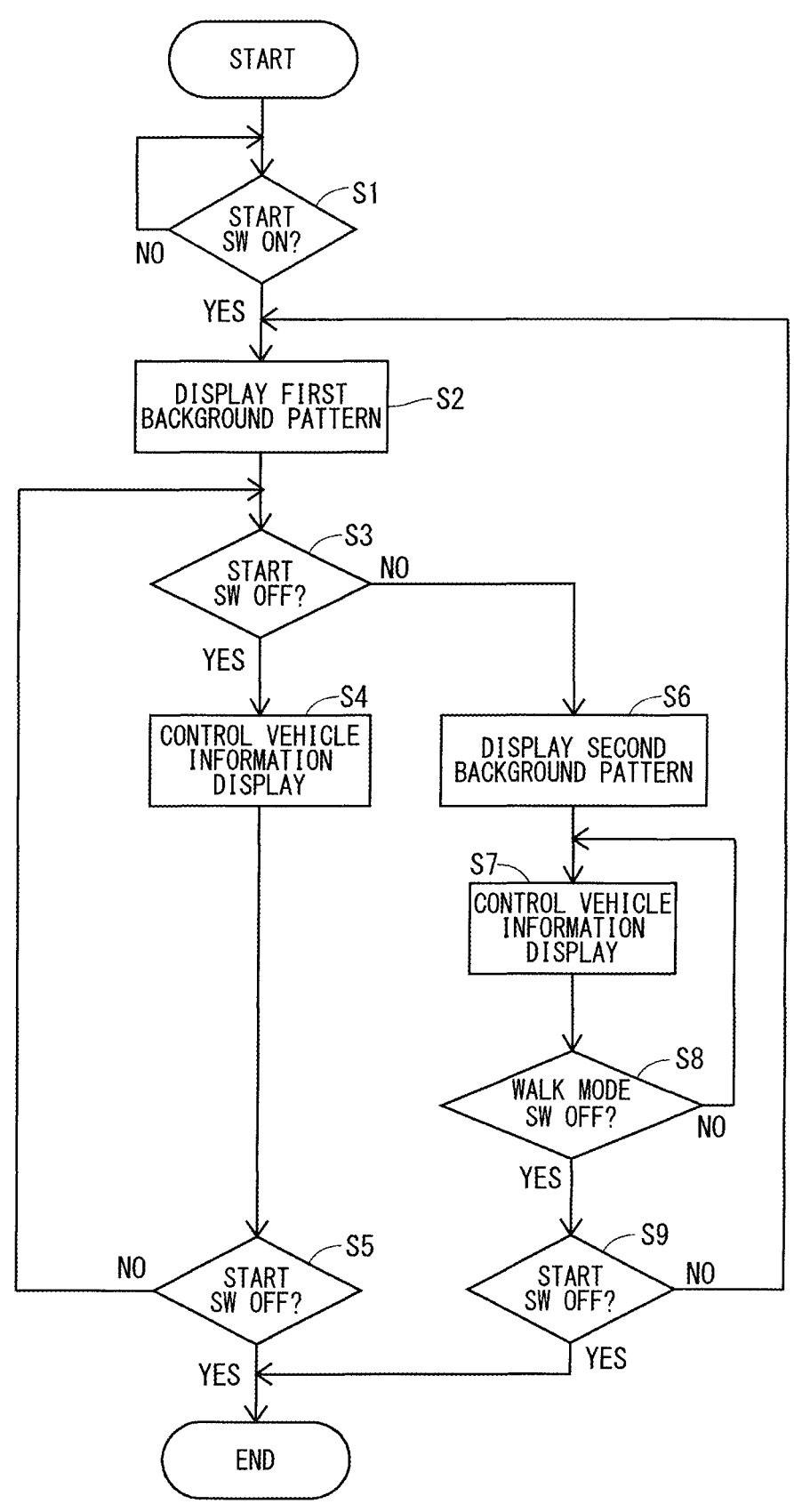

F I G.  6
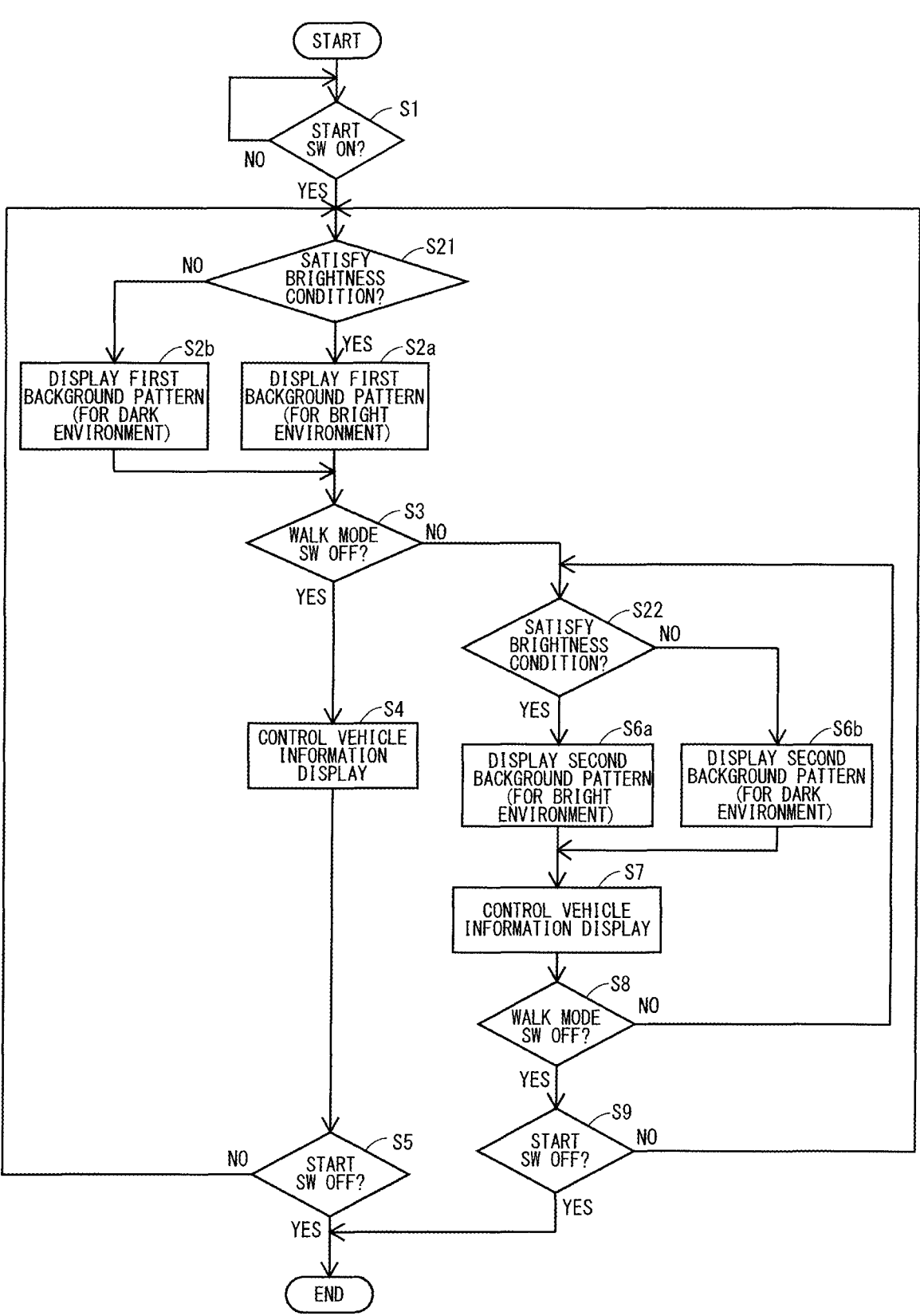

F I G. 7
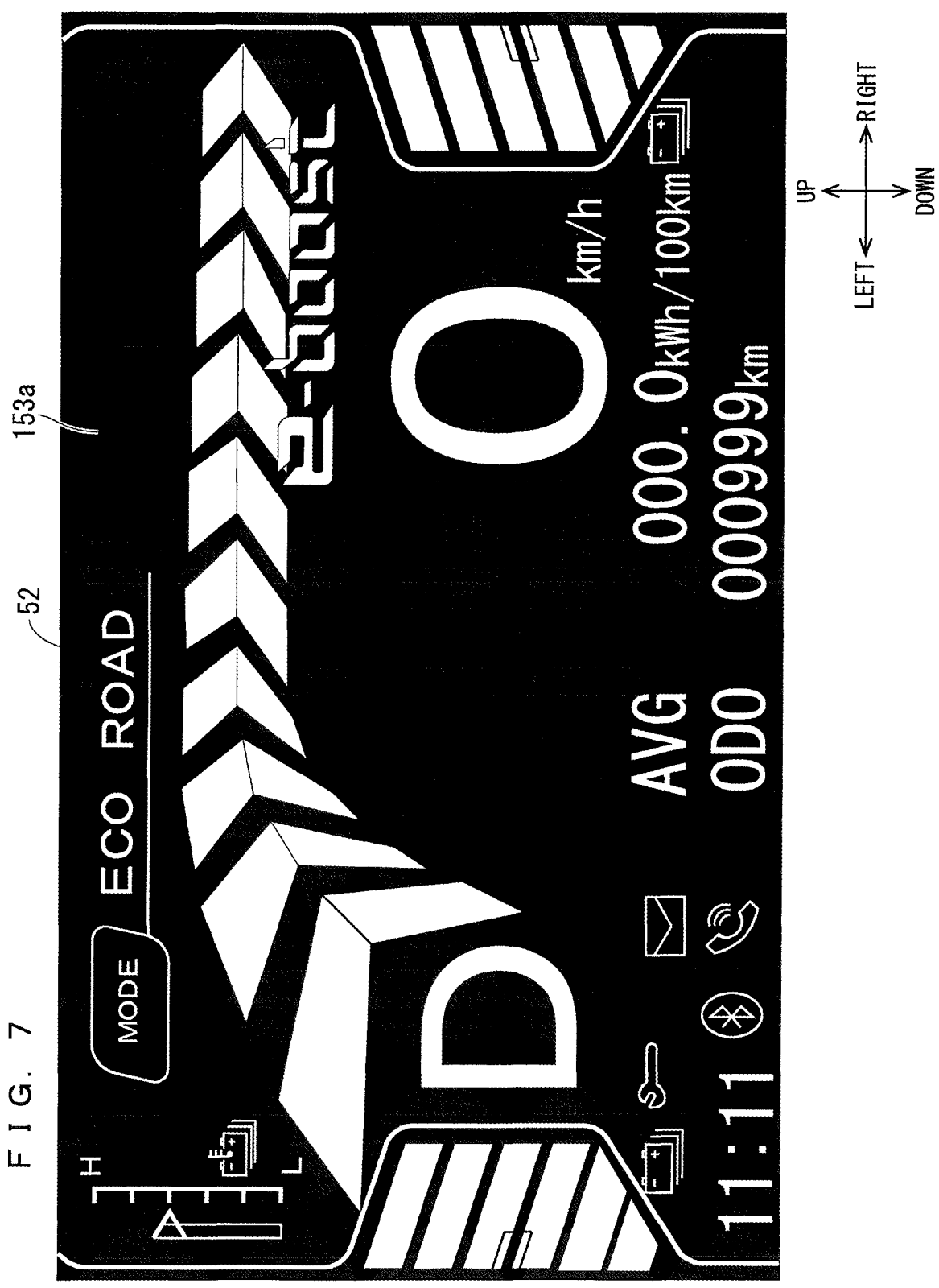

F I G. 8
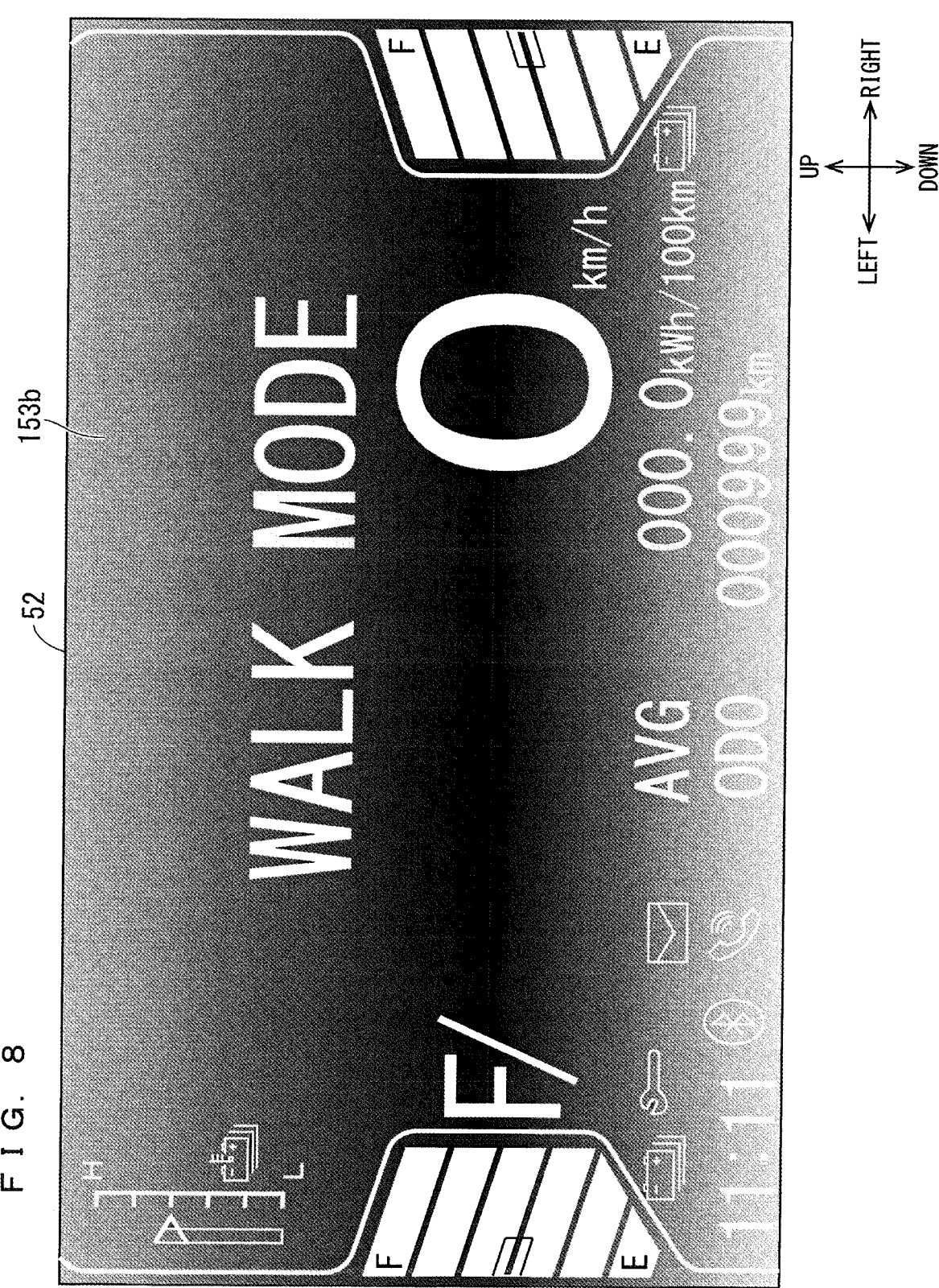

DISPLAY SYSTEM FOR VEHICLE, VEHICLE, AND DISPLAY METHOD FOR VEHICLE

BACKGROUND OF THE INVENTION

Field of the Invention

The present disclosure relates to a display system for a vehicle, a vehicle, and a display method for the vehicle.

Description of the Background Art

Japanese Patent Application Laid-Open No. 2012-162095 discloses a technique of an automatic two-wheel vehicle which can set a slight advance mode.

SUMMARY

There is a case where a vehicle includes a plurality of travel modes. Required is that a current travel mode is easily recognized for an operator.

An object is to improve a recognition property of a current travel mode by an operator.

A display system for a vehicle is a display system for a vehicle which can set a first travel mode and a second travel mode, including: a display displaying an information image indicating vehicle information to be superimposed on a background pattern; and a circuitry controlling a display on the display so that a first background pattern is set as the background pattern when the first travel mode is set and a second background pattern visually recognized to be different from the first background pattern is set as the background pattern when the second travel mode is set.

A display method for a vehicle is a display method for a vehicle which can set a first travel mode and a second travel mode, including: displaying an information image indicating vehicle information to be superimposed on a first background pattern when the first travel mode is set; and displaying the information image to be superimposed on the second background pattern visually recognized to be different from the first background pattern when the second travel mode is set.

According to the display system and the display method, a recognition property of a current travel mode by an operator is improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic side view illustrating a whole configuration of an automatic two-wheel vehicle according to a first embodiment.

FIG. 2 is a block diagram illustrating an electrical configuration of the automatic two-wheel vehicle.

FIG. 3 is a diagram illustrating a display example of a display device in a normal travel mode.

FIG. 4 is a diagram illustrating a display example of the display device in a walk mode.

FIG. 5 is a flow chart illustrating a display processing example.

FIG. 6 is a flow chart illustrating a display processing example according to a second embodiment.

FIG. 7 is a diagram illustrating another display example of the display device in the normal travel mode.

FIG. 8 is a diagram illustrating another display example of the display device in the walk mode.

DESCRIPTION OF THE PREFERRED EMBODIMENTS

First Embodiment

<Whole Configuration>

Described hereinafter are a display system for a vehicle, a vehicle, and a display method for vehicle according to a first embodiment. An example that a vehicle is a saddle-riding vehicle is described in the present embodiment. The saddle-riding vehicle is a vehicle in which a driver straddles a sheet in a drive state or a stopping state. An example that the saddle-riding vehicle is an automatic two-wheel vehicle is described in the present embodiment. The automatic two-wheel vehicle may be a motor scooter. It is not necessary that the saddle-riding vehicle is the automatic two-wheel vehicle. The saddle-riding vehicle may be an all terrain vehicle (ATV) such as a four-wheel buggy or a personal watercraft, for example.

FIG. 1 is a schematic side view illustrating a whole configuration of an automatic two-wheel vehicle 10. When upper and lower sides, front and back sides, and right and left sides are referred in the description hereinafter, each direction is defined as follows. A side on which a front wheel 20 and a rear wheel 22 of the automatic two-wheel vehicle 10 are connected to a road surface is a lower side, and a side opposite thereto is an upper side. A travel direction in which the automatic two-wheel vehicle 10 travels is a front side, and a side opposite thereto is a back side. Right and left based on a driver riding on the automatic two-wheel vehicle 10 and facing forward are right and left sides of the automatic two-wheel vehicle 10.

The automatic two-wheel vehicle 10 includes a vehicle body frame 12, the front wheel 20, the rear wheel 22, and a travel power source 30. The front wheel 20 is rotatably supported on a front side of the vehicle body frame 12. The rear wheel 22 is rotatably supported on a back side of the vehicle body frame 12. The vehicle body frame 12 is provided with the travel power source 30. A handle device 40 is provided on the front side of the vehicle body frame 12. An orientation of the front wheel 20 is changed by a driver operating the handle device 40. The orientation of the front wheel 20 is changed, thus a travel direction of the automatic two-wheel vehicle 10 is changed. A sheet 28 on which the driver sits is provided on an upper side of the vehicle body frame 12 between the front wheel 20 and the rear wheel 22.

The travel power source 30 generates power for the automatic two-wheel vehicle 10 to travel. The travel power source 30 includes an electrical motor for traveling, for example. The travel power source 30 may include an internal combustion engine for traveling in addition to or in place of the electrical motor for traveling. The description hereinafter is based on an assumption that the travel power source 30 is mainly an electrical motor for traveling. The power of the travel power source 30 is transmitted to the rear wheel 22 via a power transmission mechanism 32, thereby rotationally driving the rear wheel 22. The power transmission mechanism 32 is a rotation transmission mechanism including a chain, for example. The power transmission mechanism 32 may include a shift transmission mechanism changing a rotational speed of the travel power source 30 by a combination of a plurality of gears to transmit the power to the rear wheel 22. The travel power source may be incorporated into the rear wheel or the front wheel. In this case, the power of the travel power source may be directly transmitted to the rear wheel or the front wheel.

The handle device 40 includes a pair of handle grips 42 on right and left sides. A display device 50 is disposed around the handle device 40. For example, the display device 50 is disposed in a position where the driver sitting on the sheet 28 and gripping the pair of handle grips 42 can visually see the display device 50. The display device 50 is located in a position closer to the front side in relation to the handle device 40. The display device 50 may be supported by the handle device 40 and rotated in accordance with a steering of the handle device 40. The display device 50 may be supported in a constant position in the vehicle body frame 12 via a bracket, for example, so as not to be rotated even when the handle device 40 is operated. The driver is an operator of the automatic two-wheel vehicle 10, and is also an operator of the display device 50.

The display device 50 is a device displaying an information image indicating vehicle information. The display device 50 is a liquid crystal display device or an organic electro-luminescence (EL) display device, for example. The display device 50 can preferably display the vehicle information with colors. Assumed as the vehicle information is travel information of the automatic two-wheel vehicle 10 and state information of the automatic two-wheel vehicle 10 itself, for example. The information image is an image indicating information by a picture such as pictogram, a graphic, or a code such as a character, for example. The information image includes information indicating a travel state, information indicating a vehicle state, or supplementary information, for example. For example, the information image may include information indicating a travel state such as a vehicle speed, an outside temperature, a travel distance, and a fuel cost which the driver needs to confirm in traveling. The information image may include information indicating a vehicle state such as a gear position, a remaining amount of fuel, an engine temperature, a travel mode, or a display of abnormality, for example. The information image may include supplementary information or information indicating new functional information which does not have influence on traveling such as incoming information of e-mail or telephone, for example. The incoming information of e-mail or telephone is incoming information in a terminal device (smartphone, for example) held by a passenger, and is information obtained by a controller mounted to a vehicle performing communication with the terminal device. A display example of the display device 50 is described hereinafter.

The automatic two-wheel vehicle 10 includes a walk mode switch 44. The walk mode switch 44 is a switch switching a travel mode of the automatic two-wheel vehicle 10 between a normal travel mode and a walk mode. The normal travel mode is an example of a first travel mode, and the walk mode is an example of a second travel mode. The first travel mode may be a mode having more opportunity of traveling than the second travel mode (that is to say, a mode used frequently or a mode in which a utility time is long when an average usage state is assumed). The first travel mode may be a mode having less travel limitation than the second travel mode. The second travel mode may be a mode in which a special operation of the driver is necessary for performing a mode operating compared with the first travel mode. The second travel mode may be a mode having more strict conditions to be executed than the first travel mode.

The walk mode is a mode in which an electrical motor for traveling as an example of the travel power source 30 is controlled while there is a limitation on a speed in at least a throttle operation compared with the normal travel mode. The speed limitation is a limitation so that the travel speed is substantially equal to a walking speed, for example, and is a speed limitation that a maximum speed is equal or smaller than 10 m/h or 6 km/h, for example. The normal travel mode is a normal drive mode in which the automatic two-wheel vehicle 10 can travel on a road, and is a mode in which the automatic two-wheel vehicle 10 can travel at a speed larger than the maximum speed in the walk mode.

One of the pair of handle grips 42 on the right and left sides in the handle device is a throttle. A rotational speed of the travel power source 30 is controlled in accordance with a throttle operation in the normal travel mode and the walk mode described above. The automatic two-wheel vehicle 10 is controlled in the walk mode so as to travel at a low speed under the maximum speed limitation described above. In the walk mode, a change amount per unit time corresponding to increase and decrease of a grip operation amount or a drive power change may be gentler than that in traveling in the normal travel mode as the first travel mode.

The automatic two-wheel vehicle 10 includes a start switch 46. The start switch 46 is a switch switching a state of the automatic two-wheel vehicle 10 between a travelable state and a stopping state. When the start switch 46 is turned on, the state is switched to the travelable state in which the travel power source 30 can be driven. When the start switch 46 is turned off, power supply to the travel power source 30 is cut off and the state is switched to the stopping state.

The walk mode switch 44 and the start switch 46 are preferably a man-machine interface receiving the operation of the driver, and may also be a push switch, a slide switch, or a touch panel, for example. Arrangement positions of the walk mode switch 44 and the start switch 46 are not particularly limited. The walk mode switch 44 and the start switch 46 may be provided to the handle device 40 or the display device 50.

The automatic two-wheel vehicle 10 may include a brake. For example, a brake lever may be attached to at least one of the pair of handle grips 42 on the right and left sides. The rotational speed of the travel power source 30 may be controlled in accordance with operations of the throttle and the brake lever.

The power transmission mechanism 32 may include a shift transmission mechanism including a plurality of gears. In this case, the speed control of the automatic two-wheel vehicle 10 may be performed by control on the travel power source 30 and the shift transmission mechanism of the power transmission mechanism 32.

The automatic two-wheel vehicle 10 may travel backward in the walk mode. For example, it is applicable that the throttle is rotated from a neutral position in a forward direction so that the automatic two-wheel vehicle 10 travels forward, and the throttle is rotated from the neutral position in a reverse direction so that the automatic two-wheel vehicle 10 travels backward. Traveling forward and backward may be switched by switching the control of a drive electrical motor to switch the rotational direction of the travel power source 30 between the forward direction and the reverse direction. It is also applicable that the power transmission mechanism 32 includes a gear to switch traveling forward and backward as the other example of switching traveling forward and backward, and a rotation in one direction of the travel power source 30 is switched between a rotation for traveling forward and a rotation for traveling backward by switching the gear, and then transmitted.

The automatic two-wheel vehicle 10 may include a battery 48. Power from the battery 48 is supplied to the travel power source 30 via a travel drive circuit 34. The travel drive circuit 34 is an inverter circuit, for example.

The automatic two-wheel vehicle 10 includes a control device 61. The control device 61 is an electrical control device controlling each unit in the automatic two-wheel vehicle 10. The control device 61 includes a travel control processing function including a processing function of controlling the travel power source 30 via the travel drive circuit 34. In the present embodiment, the automatic two-wheel vehicle 10 can set the normal travel mode and the walk mode via the walk mode switch 44. The control device 61 executes travel control processing in which the limitation by the walk mode is removed when the normal travel mode is set, and executes travel control processing with a predetermined limitation when the walk mode is set. The control device 61 includes a processing function as a display control part controlling display on the display device 50.

<Block Diagram>

FIG. 2 is a block diagram illustrating an electrical configuration of the automatic two-wheel vehicle 10. The automatic two-wheel vehicle 10 includes a display system 60 including the control device 61 and the display device 50.

The control device 61 is a microcomputer including a processor 62 and a storage device 64, for example. The control device 61 is an example of a processing circuit. The processor 62 is an electrical circuit including an arithmetic circuit, and is a central processing unit (CPU), for example. The processor 62 may include one or more processor cores. The processing in the control device 61 may be achieved by one or more processors 62 included in the control device 61, or may also be achieved by cooperation processing of a plurality of control devices. The storage device 64 is a non-volatile memory such as a flash memory. The storage device 64 stores a software program 64a. The processor 62 executes an arithmetic operation in accordance with a processing procedure described in the program 64a, thus processing of controlling the display on the display device 50 is executed as described hereinafter. The storage device 64 stores first background data 64b and second background data 64c. The first background data 64b and the second background data 64c are data expressing a background pattern to be displayed as a background disposed around a code indicated as the information image in the display device 50. The background pattern corresponds to an image as a base, in other words, a blank space for the information image indicated by the code. The background pattern is preferably a display generating a contrast with the information image to increase visibility of the information image. For example, the background pattern may be formed to be white when the information image is black in the first travel mode. For example, the background pattern may be formed to be black when the information image is white in the first travel mode.

The control device 61 is connected to the display device 50, the travel drive circuit 34, the start switch 46, and the walk mode switch 44.

The display device 50 performs display corresponding to the display control by the control device 61. The travel drive circuit 34 supplies the power to the travel power source 30 in accordance with control by the control device 61. The travel drive circuit 34 supplies the power to control the number of rotation and a rotational direction of the travel power source 30 in accordance with instruction by the control device 61.

When the driver operates the start switch 46 or the walk mode switch 44, the start switch 46 or the walk mode switch 44 receives the operation. The received instruction is inputted to the control device 61 from the start switch 46 or the walk mode switch 44.

The control device 61 is connected to the other various operation receiving devices 68 and various sensors 69.

The various operation receiving devices 68 are a man-machine interface receiving the operation of the driver, and are a push switch, a slide switch, or a touch panel, for example. Arrangement positions of the various operation receiving devices 68 are not particularly limited. Various instructions on the automatic two-wheel vehicle 10 are received through the various operation receiving devices 68, and inputted to the control device 61.

The various sensors 69 are a speed sensor, a sensor for measuring a remaining amount of the battery 48, a temperature sensor of the battery 48, or an illuminance sensor detecting brightness around the automatic two-wheel vehicle 10, for example. A detection result of the various sensors 69 is inputted to the control device 61.

The control device 61 can perform the travel control of the automatic two-wheel vehicle 10 and the display control of the display device 50 based on the input from the various operation receiving devices 68 and the various sensors 69, for example.

The control device 61 may be communicably connected to a mobile terminal device such as a smartphone via a communication circuit.

<Display Example of Display Device>

FIG. 3 is a diagram illustrating a display example of the display device 50 in the normal travel mode. FIG. 4 is a diagram illustrating a display example of the display device 50 in the walk mode.

The display device 50 includes a display screen 52. The information image indicating the vehicle information is displayed to be superimposed on the background pattern in the display screen 52. In other words, the background pattern is displayed as a base or a blank space around the information image. It is also applicable that the background pattern includes pattern information including an arrangement region of the information image, and the information image is superimposed on the background pattern to overwrite the arrangement region with the information image, and there may also be a case where the background pattern does not include pattern information including an arrangement region of the information image, and the background pattern is displayed to extend around the information image.

Prepared as the background patterns are a first background pattern 53a for the normal travel mode and a second background pattern 53b for the walk mode. The first background pattern 53a is a pattern defined by the first background data 64b described above, and the second background pattern 53b is a pattern defined by the second background data 64c described above. In the normal travel mode as the first travel mode, the information image is displayed to be superimposed on the first background pattern 53a. In the walk mode as the second travel mode, the information image is displayed to be superimposed on the second background pattern 53b visually different from the first background pattern 53a.

Described more specifically is a display example of the display device 50 in the normal travel mode. In the normal travel mode, a normal travel information image 54 and a common information image 55 are displayed as the information image in the first travel mode to be superimposed on the first background pattern 53a.

The normal travel information image 54 is an information image which is displayed in the normal travel mode, and is not displayed in the walk mode. That is to say, the normal travel information image is an information image for only the first travel mode which is not displayed in the second travel mode. The normal travel information image 54 is an image indicating information regarding traveling in the normal travel mode. In the first travel mode, a plurality of modes are further selectively provided. Specifically, as a first mode, modes having different output characteristics are prepared, such as an eco mode suppressing fuel consumption, a sport mode enhancing the output characteristics compared with the eco mode, and a boost mode temporality enhancing acceleration characteristics. In the present embodiment, the normal travel information image 54 includes an eco/sport mode information image 54a and a boost mode information image 54b. The eco/sport mode information image 54a is an information image indicating whether the mode is a power saving travel mode limiting output of the travel power source 30 to be appropriate for power saving or a sport mode removing the output limitation for power saving. Specifically, the eco/sport mode information image is displayed on an outer side in an up-down direction, more specifically, in an upper side region. The boost mode is a mode temporality increasing the output limitation of the travel power source compared with the output limitation in the normal travel mode. The boost mode information image 54b is an image indicating an activation state of the boost mode, for example.

The common information image 55 is an information image displayed in both the normal travel mode and the walk mode. The common information image is an image indicating information regarding both the normal travel mode and the walk mode or information to be provided regardless of the mode. In the present embodiment, the common information image 55 includes a speed information image 55a, a travel direction information image 55b, a battery remaining amount image 55c, a battery temperature image 55d, an auxiliary travel information image 55e, a time image 55f, a setting image 55g, and a connection information image 55h. The common information image is preferably disposed close to a center of the screen, specifically, close to a center in the up-down direction. In the present embodiment, the common information image disposed close to the center of the screen is a speed display image and a battery remaining amount display.

The speed information image 55a is an image indicating a travel speed of the automatic two-wheel vehicle 10. The travel direction information image 55b is an image indicating a travel direction of the automatic two-wheel vehicle 10. For example, it is considered that the travel direction information image 55b displays a forward state (D) in the normal travel mode, and displays a state of being able to travel forward and backward (F/R) in the walk mode. When the vehicle is a hybrid electric vehicle (HEV), the travel direction information image 55b may display a transmission stage (the number from 1 to a final stage) in the normal travel mode. The travel direction information image 55b may perform display indicating traveling forward (F) in traveling forward and display indicating traveling backward (R) in traveling backward in the walk mode. The display indicating traveling forward (F) and the display indicating traveling backward (R) may not be displayed in separate regions, but may be displayed interchangeably in the same region. The battery remaining amount image 55c is an image indicating a remaining amount of the battery 48. The plurality of battery remaining amount images 55c can indicate a remaining amount of each battery 48 in a case where the plurality of batteries 48 are provided. The battery temperature image 55d is an image indicating a temperature of the battery 48. The auxiliary travel information image 55e needs not be necessarily confirmed in traveling, but is information which may be helpful, and is an image indicating an average electricity cost and an accumulated travel distance, for example. The time image 55f is an image indicating a current time. The setting image 55g is an image indicating that a setting is being performed on a vehicle by a switch separately provided, for example. The connection information image 55h is an image indicating connection information of a mobile terminal device such as a smartphone connected to the automatic two-wheel vehicle 10.

The speed information image 55a is large and noticeably located in a region close to a right side in an intermediate region in the up-down direction. The travel direction information image 55b is located on a left side of the speed information image 55a. Two battery remaining amount images 55c are located on left and right sides of the speed information image 55a and the travel direction information image 55b.

The boost mode information image 54b is located to extend in the right-left direction between the intermediate region and an upper end region in the up-down direction of the display screen 52. A left end of the boost mode information image 54b surrounds upper and right sides of the travel information image 55b. The boost mode information image 54b is directed upward from the left end toward the right side, and extends along a horizontal direction on the upper side of the speed information image 55a.

The eco/sport mode information image 54a is located on an upper side of the boost mode information image 54b. The battery temperature image 55d is located on a left side of the eco/sport mode information image 54a and the boost mode information image 54b.

The auxiliary travel information image 55e is located on a lower side of the speed information image 55a, and the time image 55f, the setting image 55g, and the connection information image 55h are located on a lower side of the battery remaining amount image 55c and the travel direction information image 55b on the left side.

Described more specifically is a display example of the display device 50 in the walk mode. The information image in the normal travel mode and the information image in the walk mode may be the same or different from each other. In the present embodiment, they are different from each other.

That is to say, in the walk mode, a walk mode information image 56 and the common information image 55 are displayed as the information image in the second travel mode to be superimposed on the second background pattern 53b. The walk mode information image 56 is an information image which is displayed in the walk mode, and is not displayed in the normal travel mode. That is to say, the walk mode information image is an information image for only the second travel mode which is not displayed in the first travel mode.

The walk mode information image 56 is an example of the second travel mode display image indicating that the automatic two-wheel vehicle 10 is in the walk mode. In the present embodiment, the walk mode information image is an image indicating characters "WALK MODE". The walk mode information image 56 may not be a character, but may be a diagram indicating that the automatic two-wheel vehicle 10 is in the walk mode. In the walk mode, the normal travel information image 54 described above is not displayed, however, the walk mode information image 56 is displayed instead. The walk mode information image 56 is displayed in place of the normal travel information image 54, thus the display image in the display screen 52 is simplified and an information amount is reduced. Accordingly, the walk mode information image 56 is noticeably displayed in the walk mode. The second background pattern 53*b* is noticeably displayed. The walk mode information image 56 is located on an upper side of the speed information image 55*a*. It is not necessary to display the walk mode information image 56. The walk mode information image is preferably disposed close to the center of the screen, specifically, close to the center in the up-down direction. In the present embodiment, the walk mode information image is disposed close to an upper side in relation to the center of the screen.

The walk mode is an example of the second travel mode, thus the walk mode information image 56 is an example of the second travel mode information image indicating that the automatic two-wheel vehicle 10 is in the second travel mode.

The common information image 55 is an information image also displayed in the normal travel mode. Displayed as the travel direction information image 55*b* is an image indicating that the automatic two-wheel vehicle 10 can selectively travel forward and backward in accordance with the throttle operation, that is a character "F/" or "/R" herein. In the walk mode, the normal travel information image 54 may be displayed. The character "F/" or "/R" may be displayed as the walk mode information image indicating that the automatic two-wheel vehicle 10 is not in the drive mode.

In the walk mode, the walk mode information image 56 is displayed, thus the driver can recognize that the automatic two-wheel vehicle 10 is in the walk mode. The first background pattern 53*a* and the second background pattern 53*b* are visually different from each other so that the driver can recognize that the automatic two-wheel vehicle 10 is in the walk mode more reliably.

The background pattern is defined by one or a plurality of combination of a color, a shape, and a change in contracting density, for example. The first background pattern and the second background pattern are information recognized to be visually different from each other. The shape may be grasped as a background design. The background design may be a geometric shape or image, or may also be a geometric shape or repeated pattern. The background pattern may be a plain pattern in which a plain color uniformly extends. A state where the first background pattern 53*a* and the second background pattern 53*b* are visually different from each other indicates that they are recognized to be a different background when seen through eyes, and is set in a different display state. Two background patterns indicate a case where a color, a shape, or a change in contracting density, for example, is different. For example, it is also applicable that the first background pattern 53*a* and the second background pattern 53*b* have a color recognized to be visually different from each other, have a different base graphic expressed by a diagrammatic drawing or a repeated pattern of color separation, or have a contrasting density pattern recognized to be visually different from each other in a same color system. It is also applicable that the first background pattern 53*a* and the second background pattern 53*b* have a color, a shape, or a contrasting density, at least two of which are different from each other, thus these are recognized as different backgrounds. The visual difference of the background pattern may be achieved by temporally changing one or a combination of a color, a shape, or a contrasting density, for example. For example, it is applicable that the first background pattern is a pattern always displaying the same background pattern, and the second background pattern is a blinking pattern repeating display and stop of display of the background pattern. The background pattern is not limited thereto described above, but it is sufficient that the first background pattern and the second background pattern may be grasped to be visually different from each other.

The background pattern is preferably a simple background to favorably achieve visibility of the information images 54, 55, and 56. It is preferable to make the first background pattern 53*a* and the second background pattern 53*b* visually different from each other with a simple background. Thus, for example, the first background pattern 53*a* and the second background pattern 53*b* may be different in a color phase, color saturation, or brightness. The other color phase, color saturation, or brightness may further be different in a state where a color phase, color saturation, or brightness is different. The color phase indicates a hue such as red, green, blue, yellow, and purple, for example. The color saturation indicates an extent of color clearness, and is a degree of mixture of while, gray, and black. The brightness is a degree of chromatic brightness, and a color is close to black when the brightness is low, and close to white when the brightness is high.

In the present embodiment, the first background pattern 53*a* in the normal travel mode is a plain pattern with a plain color, and is a white plain pattern, for example.

The second background pattern 53*b* in the walk mode is at least partially different in brightness from the first background pattern 53*a*. In the present embodiment, the second background pattern 53*b* is a gradation pattern including a region in which a color is gradually changed. The second background pattern 53*b* includes an up-down direction intermediate region 53*b*3 as an example of a central region and an upper region 53*b*1 and a lower region 53*b*5 as examples of an outer side region.

The central region is a region located in a center in one of upper and lower sides or right and left sides in the whole first background pattern 53*a*, and is an up-down direction intermediate region 53*b*3 located in a center in the up-down direction. The outer side region is a region located outside the upper, lower, left, or right side of the central region, and is the upper region 53*b*1 and the lower region 53*b*5 in the present embodiment. The brightness in the up-down direction intermediate region 53*b*3 is different from that of the upper region 53*b*1 or the lower region 53*b*5.

A difference in brightness between the information image (for example, the information images 55*a* and 55*b*) and the up-down direction intermediate region 53*b*3 is larger than that between the information image (for example, an image below the information image 55*e*) and the upper region 53*b*1 or the lower region 53*b*5. For example, the up-down direction intermediate region 53*b*3 is bright, and the information image (for example, the information images 55*a* and 55*b*) in the up-down direction intermediate region 53*b*3 has a dark color, thus the difference in the brightness therebetween is large. The upper region 53*b*1 or the lower region 53*b*5 is dark, and has a dark color and has the same color as the information image in the up-down direction intermediate region 53*b*3. Thus, the difference in brightness described above in the up-down direction intermediate region 53*b*3 is larger than that in the upper region 53*b*1 or the lower region 53*b*5, and the information image (for example, the information images 55*a* and 55*b*) is easily recognized in the up-down direction intermediate region 53*b*3.

More specifically, the brightness of the up-down direction intermediate region 53*b*3 of the second background pattern 53*b* is higher than that of the upper region 53*b*1 and the lower region 53*b*5. The color is gradually changed in a boundary region 53*b*2 between the up-down direction intermediate region 53*b*3 and the upper region 53*b*1 and a boundary region 53*b*4 between the up-down direction intermediate region 53*b*3 and the lower region 53*b*5. The up-down direction intermediate region 53*b*3 may be a region in a center of the display screen 52 in the up-down direction or a region closer to an upper side or a lower side in relation to the center thereof.

The difference in brightness described above is kept also in a case where the display is performed with the brightness reversed by switching a day-night display, for example. The brightness of the central region of the first background pattern in the right-left direction may be higher than that of the region on the right or left side thereof.

In consideration of conditions that a state where the automatic two-wheel vehicle has an original travel function is the normal travel mode and the walk mode is not a steady mode but is a special mode compared with the normal travel mode, the second background pattern 53*b* is preferably the background pattern more special than the first background pattern 53*a*.

In this point, the gradation pattern described above is a more special pattern as a background color than a background pattern wholly having a uniform color. Thus, when the first background pattern 53*a* is a pattern which does not include a region in which the color is gradually changed and the second background pattern 53*b* includes a gradation pattern, the driver easily recognizes that the pattern is changed to the second background pattern 53*b*. Accordingly, the driver easily recognizes the second background pattern 53*b* and the state is the walk mode. The gradation pattern itself is not a complex pattern so much, thus hardly has influence on a recognizability of the images 54, 55, and 56.

It is also applicable that the first background pattern 53*a* is an achromatic color pattern and the second background pattern 53*b* is a chromatic color pattern to provide a special impression, for example, to the second background pattern 53*b* compared with the first background pattern 53*a*. The achromatic color is a color having brightness of zero, and is white, black, or gray between white and black. The chromatic color is a color excluding the achromatic color. For example, it is also applicable that the upper and lower regions 53*b*1 and 53*b*5 are chromatic color region and a color is gradually changed from a white region of the intermediate region 53*b*3 in the up-down direction toward the chromatic color region in the second background pattern 53*b* illustrated in FIG. 4. Any color is applicable as the chromatic color, and brown, blue, green, or red, for example, is also applicable. When the second background pattern has the chromatic color, it may be set to a reddish color (red, bright red, orange, or yellow) to express specialty. In the present embodiment, a region in the second background pattern on both sides in the up-down direction is set to an orange color.

In this case, the chromatic color region in the second background pattern 53*b* has a color phase, color saturation, or brightness different from the plain white region in the first background pattern 53*a*.

In consideration of conditions that the second background pattern 53*b* is the gradation pattern described above, and is the chromatic color pattern as described above, the upper region 53*b*1 and the lower region 53*b*5 preferably have color saturation higher than the up-down direction intermediate region 53*b*3. When the color saturation is low, the background is hardly noticeable, thus the image displayed in a region having the low color saturation is easily recognized. When the color saturation of the up-down direction intermediate region 53*b*3 is low, the information displayed in the intermediate part of the display screen 52 in the up-down direction, that is the speed information image 55*a* and the travel direction information image 55*b*, for example, can be easily recognized.

The color saturation of both the upper region 53*b*1 and the lower region 53*b*5 needs not be necessarily higher than that of the up-down direction intermediate region 53*b*3. The color saturation of the upper region 53*b*1 or the lower region 53*b*5 may be higher than that of the up-down direction intermediate region 53*b*3.

From this viewpoint, the image displayed in the up-down direction intermediate region can be easily recognized even when the second background pattern 53*b* is not the gradation pattern or the upper region and the lower region have the higher color saturation than the up-down direction intermediate region.

It is preferable that the second background pattern is formed into the gradation pattern and the display region of the walk mode information image 56 and/or the display region of the common information image 55 is set to be close to the pattern of the region thereof in the first background pattern. Accordingly, the visibility of the walk mode information image 56 and/or the common information image 55 can be easily brought close to the visibility in the first travel mode. A region other than the display region of the walk mode information image 56 and/or a region other than the display region of the common information image 55 in the second background pattern may be set to be far from the pattern of the region thereof in the first background pattern. The background pattern of this region is made significantly different from the background pattern of the first background pattern, thus the difference of the background pattern can be easily recognized while favorably achieving the visibility of the walk mode information image 56 and/or the common information image 55.

From the similar viewpoint, the image displayed in the right-left direction intermediate region can be easily recognized even when the right-left direction intermediate region has the higher color saturation than the left region and the right region.

As described above, the speed information image 55*a* and the travel direction information image 55*b* are mainly located in the up-down direction intermediation region 53*b*3, and the walk mode information image 56 is mainly located in the boundary region 53*b*2 in the state where the second background pattern 53*b* as the chromatic color pattern is displayed. Thus, color saturation of a region around the speed information image 55*a*, the travel direction information image 55*b*, and the walk mode information image 56 is lower than the color saturation in the upper region 53*b*1 and the lower region 53*b*5 indicating the highest color saturation. When the region around the speed information image 55*a*, the travel direction information image 55*b*, and the walk mode information image 56 has the low color saturation, the speed information image 55*a*, the travel direction information image 55*b*, and the walk mode information image 56 are easily recognized.

The color saturation of the region around all of the speed information image 55*a*, the travel direction information image 55*b*, and the walk mode information image 56 needs not be necessarily lower than the highest color saturation in the second background pattern 53*b*. When the color saturation of the region around the speed information image 55*a*, the travel direction information image 55*b*, or the walk mode information image 56 is lower than the highest color saturation in the second background pattern 53*b*, the speed information image 55*a*, the travel direction information image 55*b*, or the walk mode information image 56 surrounded by the region having the low color saturation can be easily recognized.

In the present embodiment, the normal travel mode is recognized in comparison with the walk mode. Thus, the normal travel mode includes the boost mode and the eco/sport mode. Needless to say, it is also applicable that the first travel mode and the second travel mode are grasped in a relationship between the sport mode and the eco mode or the boost mode, and the different background pattern is displayed in each mode.

<Display Processing Example by Control Device>

FIG. 5 is a flow chart illustrating a display processing example by the control device 61. The present processing is executed as a parallel or pseudo-parallel processing with processing performed by the control device 61 for traveling of the automatic two-wheel vehicle 10.

As illustrated in Step S1, the control device 61 determines whether the start switch 46 is turned on. Processing of Step S1 is repeated until the driver turns on the start switch 46. When it is determined that the start switch 46 is turned on, processing proceeds to Step S2.

In Step S2, the display device 50 displays the first background pattern 53*a*.

In next Step S3, it is determined whether the walk mode switch 44 is in an off state. When it is determined that the walk mode switch 44 is in the off state, processing proceeds to Step S4. When the processing proceeds to Step S4, the walk mode switch 44 is in the off state, thus the control device 61 makes a transition to the normal travel mode or keeps a state of maintaining the normal travel mode. When the walk mode switch 44 is not in the off state, that is to say, when an on operation is performed on the walk mode switch 44 by the driver, processing proceeds to Step S6. When the processing proceeds to Step S6, the walk mode switch 44 is the on state, thus the control device 61 makes a transition to the walk mode.

In Step S4, the vehicle information images 54 and 55 are displayed to be superimposed on the first background pattern 53*a*. Assumed in Step S4 is a case where the automatic two-wheel vehicle 10 performs the normal traveling, and a speed, for example, corresponding to the normal traveling is displayed.

In next Step S5, it is determined whether the start switch 46 is turned off. When it is determined that the start switch 46 is turned off, the processing is finished, and when it is determined that the start switch 46 is not turned off, the processing returns to Step S3 to repeat the subsequent processing.

When the process proceeds from Step S3 to Step S6, the display device 50 displays the second background pattern 53*b*.

In next Step S7, the vehicle information images 55 and 56 are displayed to be superimposed on the second background pattern 53*b*. For example, the walk mode information image 56 is displayed in a region where the normal travel information image 54 is scheduled to be displayed. In Step S7, the automatic two-wheel vehicle 10 is set to the walk mode. Accordingly, the automatic two-wheel vehicle 10 travels at a low speed in accordance with a throttle operation of the driver. For example, when the driver performs the throttle operation in the forward direction, the automatic two-wheel vehicle 10 travels forward at a low speed. For example, when the driver performs the throttle operation in the reverse direction, the automatic two-wheel vehicle 10 travels backward at a low speed. The display of the travel direction information image 55*b* is switched to "F" or "R" in accordance with traveling forward and backward, and a low speed is displayed in the speed information image 55*a*.

In next Step S8, it is determined whether the walk mode switch 44 is in the off state. When it is determined that the walk mode switch 44 is in the off state, processing proceeds to Step S9. When the walk mode switch 44 is not in the off state, the processing returns to Step S7 to continue the walk mode.

When the processing proceeds to Step S9, it is determined whether the start switch 46 is turned off. When it is determined that the start switch 46 is turned off, the processing is finished, the processing is finished, and when it is determined that the start switch 46 is not turned off, the processing returns to Step S2 to return to the normal travel mode and repeat the subsequent processing.

According to the display system 60 for the automatic two-wheel vehicle 10, the automatic two-wheel vehicle 10, and the display method for the automatic two-wheel vehicle 10 having the above configuration, the display on the display device 50 is controlled so that the first background pattern 53*a* is set as the background pattern when the normal travel mode is set and the second background pattern 53*b* visually recognized to be different from the first background pattern 53*a* is set as the background pattern when the second travel mode is set. Thus, the driver of the automatic two-wheel vehicle 10 can recognize whether the mode is the normal travel mode or the walk mode by seeing the background patterns 53*a* and 53*b* extending over the display device 50 as the background. Accordingly, the driver can easily recognize the current travel mode.

Particularly, when the automatic two-wheel vehicle 10 is a vehicle traveling using an electrical motor, a sound of the travel power source 30 is hardly recognized compared with a vehicle having an internal combustion engine. Thus, there is a possibility that the difference of the travel mode is hardly recognized based on a sound, as a clue, of the travel power source 30 corresponding to the operation of the throttle, for example. In such a case, the driver can easily recognize the current travel mode by seeing the background pattern.

When the color phase, color saturation, or brightness is different between the first background pattern 53*a* and the second background pattern 53*b*, the first background pattern and the second background pattern can be distinguished by the difference of the color phase, color saturation, or brightness. For example, the difference can be easily recognized even by a monotonous and inconspicuous pattern compared with a case where a shape or a design constituting the background pattern is different.

When the first background pattern 53*a* is an achromatic color pattern and the second background pattern 53*b* is a chromatic color pattern, the second background pattern 53*b* as the chromatic pattern is easily recognized. Thus, the driver can recognize that the mode is the walk mode more easily.

In this case, when the second background pattern 53*b* as the chromatic color pattern includes the up-down direction intermediate region 53*b*3 and the upper region 53*b*1 or the lower region 53*b*5 having higher color saturation than the up-down direction intermediate region 53*b*3, the speed information image 55*a* and the travel direction information image 55*b* can be easily recognized in the up-down direction intermediate region 53*b*3. The color saturation of the upper region 53*b*1 or the lower region 53*b*5 is increased, thus the second background pattern 53*b* can be easily recognized with clearness.

The information image in the walk mode includes the speed information image 55*a*, the travel direction information image 55*b*, or the walk mode information image 56, and the color saturation of the region around the speed information image 55*a*, the travel direction information image 55*b*, or the walk mode information image 56 in the chromatic color pattern is lower than the highest color saturation in the chromatic color pattern. Thus, display contents of the speed information image 55*a*, the travel direction information image 55*b*, or the walk mode information image 56 can be easily recognized compared with the case where the speed information image 55*a*, the travel direction information image 55*b*, or the walk mode information image 56 is surrounded by a region having high color saturation.

The second background pattern 53*b* is the gradation pattern, thus special feeling is provided by a region where the color gradually changes while the speed information image 55*a* and the travel direction information image 55*b* are easily recognized in the up-down direction intermediate region 53*b*3 as a part of the background pattern, and the state of the walk mode can be easily recognized by the driver.

The walk mode information image 56 is displayed on the second background pattern 53*b* in the walk mode. Thus, the driver can recognize the meaning of change of the background pattern to the second background pattern 53*b*, that is to say, the current travel mode by seeing the walk mode information image 56 in a state where a visual sense different from normal is provided by the second background pattern 53*b*.

When the first travel mode is the normal travel mode and the second travel mode is a non-normal mode, the driver can easily recognize that the mode is changed to the non-normal mode different from normal. The non-normal mode may be a mode in which a usage time in a saddle-riding vehicle is short compared with the normal travel mode.

Particularly, when the second travel mode is the walk mode, the driver can easily recognize that the current travel mode is changed to the walk mode.

Second Embodiment

Described are a display system for a saddle-riding vehicle, a saddle-riding vehicle, and a display method for the saddle-riding vehicle according to a second embodiment. A configuration different from that in the first embodiment is mainly described in the description of the present second embodiment.

Described in the second embodiment is an example that the control device 61 changes brightness of each of the first background pattern and the second background pattern in accordance with brightness of an environment to which the display device 50 is exposed.

That is to say, the automatic two-wheel vehicle 10 includes an illuminance sensor detecting brightness around the display device 50 as the various sensors 69. A detection result of the illuminance sensor is outputted to the control device 61. The control device 61 compares the detection result of the illuminance sensor with a preset brightness condition, thereby determines whether the environment to which the display device 50 is exposed is a bright environment or a dark environment. The bright environment is daytime brightness and the dark environment is night brightness. Rainy, cloudy, or evening conditions may be the bright environment or the dark environment.

FIG. 6 is a flow chart illustrating a display processing example by the control device 61. A point different from the flow chart illustrated in FIG. 5 is mainly described.

Processing proceeds to Step S21 after Step S1. In Step S21, it is determined whether or not the brightness condition is satisfied based on the detection result of the illuminance sensor. For example, the luminosity based on the detection result of the illuminance sensor is compared with a threshold value regulating the brightness condition, and when the illuminance is equal to or larger than the threshold value, it is determined that the brightness condition is satisfied. When the illuminance based on the detection result of the illuminance sensor is equal to or smaller than the threshold value, it is determined that the brightness condition is not satisfied. The illuminance based on the detection result of the illuminance sensor is the same as the threshold value, it may be determined that the brightness condition is satisfied or is not satisfied.

When it is determined that the brightness condition is satisfied, the processing proceeds to Step S2*a*, and the first background pattern 53*a* for the bright environment is displayed. Subsequently, processing proceeds to a step S3. When it is determined that the brightness condition is not satisfied, the processing proceeds to Step S2*b*, and a first background pattern 153*a* for the dark environment is displayed. Subsequently, processing proceeds to a step S3.

Described hereinafter are examples of the first background pattern 53*a* for the bright environment and the first background pattern 153*a* for the dark environment.

In Step S3, it is determined whether the walk mode switch 44 is in the off state. When it is determined that the walk mode switch 44 is in the off state, processing proceeds to Step S4. When the walk mode switch 44 is not in the off state, that is to say, when the on operation is performed on the walk mode switch 44 by the driver, processing proceeds to Step S22.

In Step S22, it is determined whether or not the brightness condition is satisfied based on the detection result of the illuminance sensor in the manner similar to Step S21. When it is determined that the brightness condition is satisfied, the processing proceeds to Step S6*a*, and the second background pattern 53*b* for the bright environment is displayed. Subsequently, the processing proceeds to Step S7. When it is determined that the brightness condition is not satisfied, the processing proceeds to Step S6*b*, and a second background pattern 153*b* for the dark environment is displayed. Subsequently, the processing proceeds to Step S7.

Described hereinafter are examples of the second background pattern 53*b* for the bright environment and the second background pattern 153*b* for the dark environment.

Processing returns to Step S21 when it is determined that the start switch 46 is not in the off state in Steps S5 and S9. Processing returns to Step S22 when it is determined that the walk mode switch 44 is not in the off state in Step S8. The other processing is similar to the processing illustrated in FIG. 5.

Described are examples of the first background pattern 53*a* for the bright environment and the first background pattern 153*a* for the dark environment. It is assumed that a degree of opening of the driver's pupils varies depending on ambient brightness. The degree of opening of the pupils in the dark environment is assumed to be smaller than the degree of opening of the pupils in the bright environment. The brightness of the first background pattern 153*a* for the dark environment is made smaller than that of the first background pattern 53a for the bright environment, thus the driver can easily see the information displayed in the display device 50.

For example, a background pattern having high brightness, that is a plain white background, for example, is applicable as the first background pattern 53a for the bright environment as illustrated in FIG. 3. In the meanwhile, a background pattern having higher brightness than the first background pattern 53a, that is a plain black background pattern, for example, is applicable as the first background pattern 153a for the dark environment as illustrated in FIG. 7. For example, the first background pattern 153a may be a pattern having the brightness of the first background pattern 53a reversed. In this case, the information image may an open image.

In the similar manner, for example, a background pattern having high brightness, that is a gradation pattern in which a color is changed from white to the other color, for example, is applicable as the second background pattern 53b for the bright environment as illustrated in FIG. 4. In the meanwhile, a background pattern having lower brightness than the second background pattern 53b, that is a gradation pattern in which a color is changed from black to the other color, for example, is applicable as the second background pattern 153b for the dark environment as illustrated in FIG. 8. The other color may be an achromatic color or a chromatic color. For example, the second background pattern 153b may be a pattern having the brightness of the second background pattern 53b reversed. In this case, the information image may an open image.

According to the second embodiment, a function effect similar to that of the first embodiment can be obtained. In addition, the brightness of each of the first background patterns 53a and 153a and the second background patterns 53b and 153b is changed in accordance with the ambient brightness, thus the information displayed in the display device 50 can be easily recognized.

Described in the present example is an example that the degree of brightness is classified into two levels, and each of the first background patterns 53a and 153a and the second background patterns 53b and 153b is changed to two levels of brightness. It is also applicable that the degree of brightness is classified into more multiple levels, and each of the first background patterns 53a and 153a and the second background patterns 53b and 153b is changed to more multiple levels of brightness.

MODIFICATION EXAMPLE

Described in the first and second embodiments is the example that the first travel mode is the normal travel mode and the second travel mode is the walk mode.

It is not necessary to apply the above example to the first travel mode and the second travel mode. It is sufficient that the first travel mode and the second travel mode are different from each other in a travel limitation in the vehicle. For example, a degree of the limitation of the traveling may be different. Presence or absence of the limitation may be different.

A combination of the normal travel mode and a limp mode, for example, is assumed as a combination of the modes with different degrees of travel limitation. The limp mode is a mode in which a maximum speed, for example, is limited so that an automatic two-wheel vehicle can reach a home or a repair plant in which a failure of the automatic two-wheel vehicle can be solved when the failure is detected in the automatic two-wheel vehicle. A combination of the normal travel mode and a boost mode, for example, is assumed as a combination of the modes with different degrees of travel limitation. The boost mode is a mode temporality increasing an output limitation value of the travel power source compared with that in the normal travel mode.

A combination of the normal travel mode in a non-lost state of a smart key and a lost determination mode of a smart key is assumed as a combination of modes different in presence or absence of travel limitation. That is to say, in an automatic two-wheel vehicle provided with a smart key system performing wireless communication to perform authentication, there is a case of performing communication with the smart key at regular intervals in traveling to determine a lost state and a non-lost state of the smart key. When it is determined that the smart key is determined to be in the non-lost state, the power source can be turned on again by performing authentication even when the automatic two-wheel vehicle is turned off. When it is determined that the smart key is in the lost state, the authentication with the smart key cannot be performed and the automatic two-wheel vehicle cannot travel if the automatic two-wheel vehicle is turned off and authentication authority is interrupted. Thus, it is considered that the non-lost state of the smart key is a state where the travel limitation is not performed, and the lost determination mode of the smart key is a state where the travel limitation is performed from a viewpoint that when the power source is turned off once, the automatic two-wheel vehicle cannot travel again.

As a specific example of the second travel mode, applicable is a mode falling under a case where the degree of travel limitation thereof is different from that of the first travel mode, that is a mode having different travel characteristics such as the eco mode or a sport mode, for example, as described already. The second travel mode may be a mode which does not fall under a case where the degree of travel limitation is different, that is a mode indicating a difference of a drive source with the first travel mode (a mode in which the drive source is an engine, a mode in which the drive source is a hybrid of an engine and an electrical motor or a mode in which the drive source is an electrical motor), for example. In this manner, the second travel mode may be a mode in which a vehicle behavior on a drive operation is different from that of the first travel mode.

Only the background is different between the display in the first travel mode and the display in the second travel mode, thus it can be considered that the information to be displayed is displayed in common in both modes. The display system is preferably applied to a display device for displaying various types of information of a vehicle such as a display device used as a dashboard of a vehicle, for example, instead of a back monitor for projecting a back side of a vehicle.

Exemplified as the information image for only the first travel mode are the mode of distinguishing the output characteristics (eco or sport) and a vehicle state display in which a special travel mode such as the boost mode is displayed, however, the present embodiment is not limited thereto. One of the special travel mode and the mode of distinguishing the output characteristics may be displayed. The information image such as a gear display, a fuel cost display, or a travel distance display may be set as the information image for only the first travel mode.

A case where the walk mode information image 56 is not displayed may also be included in the present embodiment.

It may also be considered that the first travel mode is the normal travel mode and the second travel mode is the non-normal mode in which travel control performed on at least one operation is different compared with the first travel mode. At least one operation may be a throttle operation or an operation on a start switch, for example. The travel control may be the number of rotation or output control of a travel power source, travel speed control, or control of on-off operation of the travel power source.

A maximum speed limitation performed on the throttle operation is different between the normal travel mode and the walk mode in the first embodiment. Thus, the walk mode is an example of the non-normal mode in which the travel control performed on at least one operation is different compared with the normal travel mode.

The limp mode and the boost mode described above are also examples of the non-normal mode in which the travel control performed on at least one operation is different compared with the normal travel mode. The lost determination mode of the smart key is also different from the normal travel mode in that the travel control performed on the on operation of the power source after the operation of turning off the power source indicates whether or not the traveling can be performed, and is an example of the non-normal mode. There is a case where setting is switched between the normal travel mode and the limp mode or between the normal mode and the lost determination mode of the smart key not based on the switch operation by a driver but based on output of a sensor detecting a defect or a communication state of the smart key through a communication circuit.

The first travel mode and the second travel mode are assumed to be modes set for making the degree or presence or absence of travel limitation different. Thus, the first background pattern 53a displayed in the first travel mode and the second background pattern 53b disposed in the second travel mode are assumed to be the background patterns displayed in traveling. Accordingly, a state where the automatic two-wheel vehicle is being set using the display device or a state where the automatic two-wheel vehicle is being activated or charged is not a state set as the travel mode. Even in a case where a background pattern different from that in the normal travel mode is displayed in the display device during the setting, activation, or charge, such a case does not indicate that the first background pattern is set in the first travel mode setting state and the first background pattern is set in the second travel mode setting state. In the similar manner, even in a case where a different background pattern is displayed in the display device between the day time and night time regardless of the travel mode, such a case does not indicate that the first background pattern is set in the first travel mode setting state and the first background pattern is set in the second travel mode setting state.

Described in each embodiment described above is the case where the first background pattern 53a and the second background pattern 53b are the whole display screen 52. A region where the first background pattern and the second background pattern changed in accordance with the mode extend may be a part of a region in the display screen.

Configurations described in the above-mentioned embodiments and modifications can be combined with each other as appropriate unless any contradiction occurs.

The display system according to the present embodiment can be applied to a vehicle other than the saddle-riding vehicle in the similar manner. The vehicle may be a bicycle or a vehicle having three or more wheels. It is applicable that the vehicle is not a saddle-riding vehicle in which a driver straddles a sheet but is a vehicle in which a step on which both feet are put is formed in front of the sheet.

The display device may perform achromatic color display so that brightness can be adjusted in multiple levels. When the brightness can be adjusted in multiple levels, it is also applicable that the brightness is fixed to have one color saturation and the color saturation is not changed.

Two types of display in which white and black are reversed in accordance with ambient illuminance may be prepared in the display device. Any of two types of display in which white and black are reversed may be selected in accordance with preference of the driver. A case where only the display of white or black is provided may be adopted as the present embodiment.

The information image may be separately set in a case where an ambient environment is bright and a case where an ambient environment is dark. When the environment is bright, it is applicable that a central region of the background pattern is set to white, and when the environment is dark, the central region is set to black.

The present specification and the drawings disclose each aspect described hereinafter.

A first aspect is a display system for a vehicle which can set a first travel mode and a second travel mode, including: a display device displaying an information image indicating vehicle information to be superimposed on a background pattern; and a display control part controlling a display on the display device so that a first background pattern is set as the background pattern when the first travel mode is set and a second background pattern visually recognized to be different from the first background pattern is set as the background pattern when the second travel mode is set.

According to the first aspect, the first background pattern is set as the background pattern when the first travel mode is set, and the second background pattern visually recognized to be different from the first background pattern is set as the background pattern when the second travel mode is set. Thus, the operator of the vehicle can recognize whether the mode is the first travel mode or the second travel mode by seeing the background pattern extending over the display device as the background. Accordingly, the operator can easily recognize the current travel mode.

A second aspect is the display system for the vehicle according to the first aspect, wherein the first background pattern and the second background pattern are different in a color phase, color saturation, or brightness.

As described above, the color phase, color saturation, or brightness is different, thus the first background pattern and the second background pattern are distinguished from each other.

A third aspect is the display system for the vehicle according to the first or second aspect, wherein the first background pattern is an achromatic color pattern and the second background pattern is a chromatic color pattern.

In this case, the second background pattern as the chromatic pattern is easily recognized. Thus, the operator can recognize that the mode is the second travel mode more easily.

A fourth aspect is the display system for the vehicle according to any one of the first to third aspect, wherein the second background pattern includes a central region and an outer side region located on an outer side of the central region and having brightness different from the central region, and a difference in brightness between the central region and the information image is larger than a difference in brightness between the outer side region and the information image.

As described above, the difference in brightness between the central region and the information image is increased, thus the information image can be easily recognized in the central region.

A fifth aspect is the display system for the vehicle according to the third or fourth aspect, wherein the information image in the second travel mode includes a speed information image, a travel direction information image, or a mode information image, and color saturation of a region around the speed information image, the travel direction information image, or the mode information image in the chromatic color pattern is lower than highest color saturation in the chromatic color pattern. The mode information image herein is an image indicating that the mode is the first travel mode.

In this case, the color saturation of the region around the speed information image, the travel direction information image, or the mode information image is lower than the highest color saturation in the second background pattern, thus the speed information image, the travel direction information image, or the mode information image is easily recognized.

A sixth aspect is the display system for the vehicle according to any one of the first to fifth aspects, wherein the second background pattern is a gradation pattern including a region in which a color is gradually changed.

Accordingly, it is easily recognized that the mode is the second travel mode by the region in which the color is gradually changed while the information image is easily recognized in a part of the background pattern.

A seventh aspect is the display system for the vehicle according to any one of the first to sixth aspects, wherein the information image includes a second travel mode display image superimposed on the second background pattern in the second travel mode.

Accordingly, the operator can recognize the meaning of the second background pattern by seeing the second travel mode display image.

An eighth aspect is the display system for the vehicle according to any one of the first to seventh aspects, wherein the display control part changes brightness of each of the first background pattern and the second background pattern in accordance with brightness of an environment to which the display device is exposed.

The brightness of each of the first background pattern and the second background pattern is changed in accordance with the ambient brightness in such a manner, thus the information displayed in the display device is easily recognized.

A ninth aspect is the display system for the vehicle according to any one of the first to eighth aspects, wherein it is applicable that the first travel mode is a normal travel mode, and the second travel mode is a non-normal mode in which travel control performed on at least one operation is different from that in the first travel mode.

In this case, when the mode is changed from the normal travel mode to the non-normal mode, the operator can easily recognize that the mode has been changed to the non-normal mode.

A tenth aspect is the display system for the vehicle according to any one of the first to ninth aspects, wherein the second travel mode is a walk mode in which a speed limitation is performed on at least a throttle operation compared with the first travel mode.

In this case, the operator can easily recognize that the mode is the walk mode.

An eleventh aspect is a vehicle including the display system for the vehicle according to any one of the first to tenth aspects.

Accordingly, the operator of the vehicle can easily recognize a current travel mode.

A twelfth aspect is a display method for a vehicle which can set a first travel mode and a second travel mode, including: displaying an information image indicating vehicle information to be superimposed on a first background pattern when the first travel mode is set; and displaying the information image to be superimposed on the second background pattern visually recognized to be different from the first background pattern when the second travel mode is set.

According to the twelfth aspect, the operator of the vehicle can recognize whether the mode is the first travel mode or the second travel mode by seeing the background pattern extending over the display device as the background. Accordingly, the operator can easily recognize a current travel mode.

The present disclosure discloses a program and a storage medium for making a computer, which controls a display device for a vehicle which can set a first travel mode and a second travel mode, achieve processes of: displaying an information image indicating vehicle information to be superimposed on a first background pattern when the first travel mode is set; and displaying the information image to be superimposed on the second background pattern visually recognized to be different from the first background pattern when the second travel mode is set.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The foregoing description is in all aspects illustrative and does not restrict the present invention. It is understood that numerous unillustrated modifications can be devised without departing from the scope of the present invention.

What is claimed is:

1. A display system for a vehicle which can set a first travel mode and a second travel mode, comprising:
   a display displaying an information image indicating vehicle information to be superimposed on a background pattern; and
   a circuitry controlling on the display so that a first background pattern is set as the background pattern when the first travel mode is set and a second background pattern visually recognized to be different from the first background pattern is set as the background pattern when the second travel mode is set; and wherein the second travel mode is a walk mode in which a speed limitation is performed on at least a throttle operation compared with the first travel mode.

2. The display system for the vehicle according to claim 1, wherein the first background pattern and the second background pattern are different in a color phase, color saturation, or brightness.

3. The display system for the vehicle according to claim 1, wherein the first background pattern is an achromatic color pattern and the second background pattern is a chromatic color pattern.

4. A display system for a vehicle which can set a first travel mode and a second travel mode, comprising:

a display displaying an information image indicating vehicle information to be superimposed on a background pattern; and a circuitry controlling a display on the display so that a first background pattern is set as the background pattern when the first travel mode is set and a second background pattern visually recognized to be different from the first background pattern is set as the background pattern when the second travel mode is set; and wherein the second background pattern includes a central region and an outer side region located on an outer side of the central region and having a brightness different from the central region, and a difference in brightness between the central region and the information image is larger than a difference in brightness between the outer side region and the information image.

5. The display system for the vehicle according to claim 3, wherein the information image in the second travel mode includes a speed information image, a travel direction information image, or a mode information image, and color saturation of a region around the speed information image, the travel direction information image, or the mode information image in the chromatic color pattern is lower than a highest color saturation in the chromatic color pattern.

6. The display system for the vehicle according to claim 1, wherein the second background pattern is a gradation pattern including a region in which a color is gradually changed.

7. The display system for the vehicle according to claim 1, wherein the information image includes a second travel mode display image superimposed on the second background pattern in the second travel mode.

8. The display system for the vehicle according to claim 1, wherein the circuitry changes a brightness of each of the first background pattern and the second background pattern in accordance with a brightness of an environment to which the display is exposed.

9. The display system for the vehicle according to claim 1, wherein the first travel mode is a normal travel mode, and the second travel mode is a non-normal mode in which travel control performed on at least one operation is different from that in the first travel mode.

10. A vehicle including the display system for the vehicle according to claim 1.

11. The display system for the vehicle according to claim 4, further comprising a switch receiving user selection for switching a first travel mode and a second travel mode.

* * * * *